United States Patent
Mohan et al.

(10) Patent No.: US 9,645,566 B2
(45) Date of Patent: May 9, 2017

(54) PHYSICAL PRESENCE VERIFICATION BY AN INDUSTRIAL CONTROL SYSTEM CONTROLLER

(71) Applicant: Honeywell International Inc., Morristown, NJ (US)

(72) Inventors: Apurva Mohan, Maple Grove, MN (US); Himanshu Khurana, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 437 days.

(21) Appl. No.: 14/086,685

(22) Filed: Nov. 21, 2013

(65) Prior Publication Data

US 2015/0142138 A1    May 21, 2015

(51) Int. Cl.
*G05B 19/048* (2006.01)

(52) U.S. Cl.
CPC .. *G05B 19/048* (2013.01); *G05B 2219/24168* (2013.01)

(58) Field of Classification Search
CPC ........... G05B 2219/24161; G05B 2219/24162; G05B 2219/24165; G05B 2219/24166; G05B 2219/24167; G05B 19/048; G05B 19/05; G05B 19/058
See application file for complete search history.

(56) References Cited

U.S. PATENT DOCUMENTS

| | | | | |
|---|---|---|---|---|
| 6,180,898 B1 * | 1/2001 | Terada | ...................... | B25J 13/02 200/17 R |
| 6,222,338 B1 * | 4/2001 | Villaret | ................ | G05B 19/423 318/567 |
| 2003/0060922 A1 * | 3/2003 | Schauer | ................. | B23Q 3/186 700/213 |
| 2006/0095158 A1 * | 5/2006 | Lee | ....................... | G05D 1/0246 700/245 |
| 2006/0111811 A1 * | 5/2006 | Okamoto | ................. | B25J 5/007 700/214 |
| 2007/0096674 A1 * | 5/2007 | Hashimoto | ............ | B25J 9/1674 318/568.13 |
| 2008/0266254 A1 * | 10/2008 | Robbins | ............... | G05D 1/0016 345/161 |
| 2010/0301539 A1 * | 12/2010 | Murayama | ............. | B25J 9/1674 269/74 |
| 2013/0158708 A1 * | 6/2013 | Emmertz | ........... | G05B 19/0426 700/248 |
| 2013/0218334 A1 * | 8/2013 | Hollmann | .............. | B25J 9/1674 700/245 |

OTHER PUBLICATIONS

Knight, John C. "Safety Critical Systems: Challenges and Directions", Proceedings of the 24th International Conference on Software Engineering, May 25, 2002, pp. 547-550.

* cited by examiner

*Primary Examiner* — Nathan L Laughlin
(74) *Attorney, Agent, or Firm* — Brooks, Cameron & Huebsch, PLLC

(57) ABSTRACT

Physical presence verification by an industrial control system controller is described herein. One industrial control system controller includes a mechanism configured to verify that a user of the industrial control system controller is physically present at a location of the controller, a memory, and a processor configured to execute executable instructions stored in the memory to permit the user to perform industrial control operations using the controller only if the user is physically present at the location of the controller.

18 Claims, 2 Drawing Sheets

PHYSICAL PRESENCE VERIFICATION BY AN INDUSTRIAL CONTROL SYSTEM CONTROLLER

TECHNICAL FIELD

The present disclosure relates to physical presence verification by an industrial control system controller.

BACKGROUND

An industrial control system (ICS) may include a number of controllers, which a user (e.g., operator) may use to perform industrial control operations on components of the ICS. For example, the user may use the ICS controllers to perform control functions on and/or issue commands to equipment and/or devices of the ICS.

In many ICSs, the user may remotely access the ICS controllers to perform the control operations. That is, the user may access the ICS controllers and perform the control operations from a remote location (e.g., a different location than where the controllers are located).

Permitting such remote access, however, can present increased security risks for the ICS. For example, permitting such remote access may allow an unauthorized and/or malicious user to compromise and/or attack the ICS by remotely accessing and using the controllers to perform unwanted and/or dangerous control operations.

DETAILED DESCRIPTION

Figure 1:
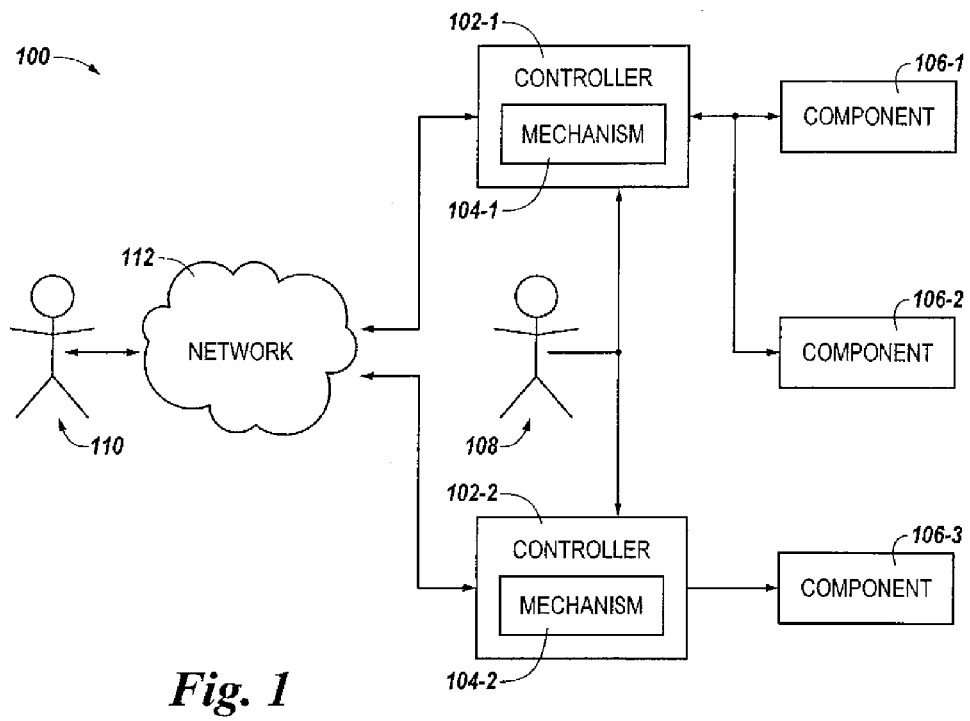
FIG. 1 illustrates an industrial control system in accordance with one or more embodiments of the present disclosure.

Physical presence verification by an industrial control system controller is described herein. For example, one or more embodiments include a mechanism configured to verify that a user of the industrial control system controller is physically present at a location of the controller, a memory, and a processor configured to execute executable instructions stored in the memory to permit the user to perform industrial control operations using the controller only if the user is physically present at the location of the controller.

Physical presence verification by an industrial control system (ICS) controller in accordance with the present disclosure can decrease security risks for an ICS. For example, physical presence verification by an ICS controller in accordance with the present disclosure can prevent an unauthorized and/or malicious user from compromising and/or attacking the ICS by remotely accessing and using the controller (e.g., accessing and using the controller from a remote location) to perform unwanted and/or dangerous control operations.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced by 204 in FIG. 2.

As used herein, "a" or "a number of" something can refer to one or more such things. For example, "a number of controllers" can refer to one or more controllers. Additionally, the designators "N" and "M" as used herein, particularly with respect to reference numerals in the drawings, indicates that a number of the particular feature so designated can be included with embodiments of the present disclosure.

FIG. 1 illustrates an industrial control system (ICS) 100 in accordance with one or more embodiments of the present disclosure. ICS 100 can include a number of controllers. For example, in the embodiment illustrated in FIG. 1, industrial control system 100 includes two controllers (e.g., controllers 102-1 and 102-2). However, embodiments of the present disclosure are not limited to a particular number of controllers.

In the example illustrated in FIG. 1, controllers 102-1 and 102-2 are located at the same location in ICS 100. However, embodiments of the present disclosure are not so limited (e.g., controllers 102-1 and 102-2 can be located at different locations in ICS 100).

A user (e.g., operator), such as, for instance, users 108 and/or 110 illustrated in FIG. 1, may use controllers 102-1 and/or 102-2 to perform industrial control operations on components of ICS 100, such as, for instance, components 106-2, 106-2, and/or 106-3 illustrated in FIG. 1. For example, users 108 and/or 110 may use controllers 102-1 and/or 102-2 to perform control functions on, and/or issue commands to, components 106-1, 106-2, and/or 106-3. However, controllers 102-1 and/or 102-2 may permit a user to perform some industrial control operations on components 106-1, 106-2, and/or 106-3 only if the user is physically present at the location of the controller(s), as will be further described herein. That is, controllers 102-1 and/or 102-2 may prevent the user from performing some industrial control operations on components 106-1, 106-2, and/or 106-3 if the user is not physically present at the location of the controller(s), as will be further described herein.

Components 106-1, 106-2, and 106-3 can be, for example, equipment and/or devices of ICS 100 controlled by controllers 102-1, 102-2, and/or 102-3, such as, for instance, furnaces, boilers (e.g., boiler plant), burners, chillers (e.g., chiller plant), valves (e.g., heating and/or cooling valves), pumps (e.g., hot and/or chilled water pumps), fans, air dampers, air handling units, coils (e.g., heating and/or cooling coils), air filters, and/or cooling towers. For instance, in the example illustrated in FIG. 1, component 106-1 may be a furnace, component 106-2 may be a boiler, and component 106-3 may be a burner. However, embodiments of the present disclosure are not limited to a particular type(s) of components. Further, although the example illustrated in FIG. 1 includes three components, embodiments of the present disclosure are not limited to a particular number of components.

In the example illustrated in FIG. 1, components 106-1 and 106-2 are controlled by controller 102-1, and component 106-3 is controlled by controller 102-2. However, embodiments of the present disclosure are not limited to a particular control relationship and/or configuration between controllers 102-1 and 102-2 and components 106-1, 106-2, and 106-3.

In the example illustrated in FIG. 1, user 108 is physically present at the location of controllers 102-1 and 102-2 (e.g., user 108 is at the same physical location as controllers 102-1 and 102-2), and accordingly can physically (e.g., directly) access the controllers to perform industrial control operations on components 106-1, 106-2, and 106-3. In contrast, user 110 is not physically present at the location of controllers 102-1 and 102-2 (e.g., user 110 is at a different physical location than controllers 102-1 and 102-2), and accordingly can not physically access the controllers to perform industrial control operations on components 106-1, 106-2, and 106-3. However, user 110 may be able to remotely access controllers 102-1 and 102-2 via network 112 to perform industrial control operations on components 106-1, 106-2, and 106-3, as illustrated in FIG. 1. That is, user 110 may access controllers 102-1 and 102-2, and perform industrial control operations on components 106-1, 106-2, and 106-3, from the user's remote location via network 112. However, because user 110 is not physically present at the location of controllers 102-1 and 102-2, user 110 may only be able to use the controllers to perform some (e.g., certain types of) industrial control operations on the components, as will be further described herein.

Network 112 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 112) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 112 can tie a number of computing devices together to form a distributed control network.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 1, each of the number of controllers can include a mechanism (e.g., controller 102-1 includes mechanism 104-1, and controller 102-2 includes mechanism 104-2). The mechanism can verify (e.g., ensure) that a user (e.g., operator) of that respective controller is physically present at the location of that respective controller (e.g., mechanism 104-1 can verify that a user of controller 102-1 is physically present at the location of controller 102-1, and mechanism 104-2 can verify that a user of controller 102-2 is physically present at the location of controller 102-2). That is, the mechanism can be a non-forgeable test that can establish the physical presence of a user at the location of the controller.

In some embodiments, the mechanism (e.g., mechanism 104-1 and/or 104-2) can be a button, and the user can press the button to verify his or her physical presence. In some embodiments, the mechanism can be a switch, and the user can flip the switch to verify his or her physical presence. In some embodiments, the mechanism can be a biometric scanner, and in some embodiments, the mechanism can be a fingerprint scanner. In some embodiments, the mechanism can be an interface, such as, for instance, a screen (e.g., touch screen), keyboard, and/or microphone, that can receive a password from the user, and the user can enter the password into the interface (e.g., type the password into the touch screen or keyboard, or speak the password into the microphone) to verify his or her physical presence.

In embodiments in which the mechanism is a button or switch, the mechanism can have a tamperproof, secure channel to communicate that the mechanism has been pressed. For example, in such embodiments, the mechanism can include a pressure sensor that senses physical pressure on the mechanism and is hardwired to a secure processor. This channel can be in parallel with the software event that is generated by the mechanism press and used to trigger the logic for establishing proof of physical presence. Only when both the pressure sensor output and the corresponding mechanism press event is received by the secure processor will physical presence be established. This out-of-band verification can prevent an unauthorized and/or malicious user from forging the mechanism press event and establishing proof of physical presence from a remote location.

Each of the number of controllers (e.g., controllers 102-1 and 102-2) can permit the user of that respective controller to perform industrial control operations on the components of ICS 100 using that respective controller only if the user is physically present at the location of that respective controller (e.g., only if the physical presence of the user at the location of that controller has been verified by the mechanism of that controller). That is, each of the number of controllers can prevent the user of that respective controller from performing industrial control operations on the components of ICS 100 using that respective controller if the user is not physically present at the location of that respective controller (e.g., if the physical presence of the user at the location of that controller has not been verified by the mechanism of that controller, such as when the user is attempting to perform the operations from a remote location). For instance, in the example illustrated in FIG. 1, controller 102-1 can permit user 108 to perform industrial control operations on components 106-1 and 106-2, and controller 102-2 can permit user 108 to perform industrial control operations on component 106-3 (e.g., because user 108 is physically present at the location of the controllers). Further, controller 102-1 can prevent user 110 from performing industrial control operations on components 106-1 and 106-2, and controller 102-2 can prevent user 110 from performing industrial control operations on component 106-3 (e.g., because user 110 is not physically present at the location of the controllers).

As an example, each of the number of controllers can permit the user of that respective controller to perform some industrial control operations on the components of ICS 100 using that respective controller only if the user is physically present at the location of that respective controller, and each of the number of controllers can permit the user of that respective controller to perform other (e.g., additional) industrial control operations on the components of ICS 100 using that respective controller regardless of whether the user is physically present at the location of that respective controller (e.g., even if the user is not physically present at the location of that controller). For instance, each of the number of controllers can permit the user of that respective controller to perform safety critical industrial control operations on the components of ICS 100 using that respective controller only if the user is physically present at the location of that respective controller, and each of the number of controllers can permit the user of that respective controller to perform non-safety critical (e.g., normal and/or standard) industrial control operations on the components of ICS 100 using that respective controller regardless of whether the user is physically present at the location of that respective controller. For instance, in the example illustrated in FIG. 1, controller 102-1 can permit user 108 to perform (e.g., prevent user 110 from performing) safety critical industrial control operations on components 106-1 and 106-2, and controller 102-2 can permit user 108 to perform (e.g., prevent user 110 from performing) safety critical industrial control operations on component 106-3. However, controller 102-1 can permit user 108 and user 110 to perform non-safety critical industrial control operations on components 106-1 and 106-2, and controller 104-2 can permit user 108 and user 110 to perform non-safety critical industrial control operation son component 106-3.

Safety critical industrial control operations can include operations that could result in loss of life, injury, property damage, and/or environmental damage, and non-safety critical industrial control operations can include operations that would not result in loss of life, injury, property damage, or environmental damage. For example, a nuclear power plant can depend on normal and/or emergency cooling to prevent the reactor from becoming excessively hot, which can potentially cause an explosion. Accordingly, in such an example, a safety critical industrial control operation would be setting and/or updating the set point (e.g., temperature) of the components of the plant at which normal and/or emergency cooling should start, because setting and/or updating the set point to an abnormally high temperature could result in the reactor becoming excessively hot, which could cause an explosion. In contrast, a non-safety critical industrial control operation in such an example would be simply reading the set point of the components of the plant.

Safety critical industrial control operations can have safety limits associated therewith, such that if these operations are performed within the safety limits, a safety incident that could result in loss of life, injury, property damage, and/or environmental damage will not result. These safety limits can be enforced by a safety manager of ICS 100, such as, for instance, safety manager 332 illustrated in FIG. 3. Industrial control operations related to the functioning and information flow of the safety manager can be considered safety critical.

The determination of whether industrial control operations are safety critical or non-safety critical can be made by performing a fault tree analysis on the operations, which can analyze operations that can cause safety incidents (e.g., faults) in an ICS. A fault tree can be condensed to build the minimum set of non-repetitive industrial control operations that can result in safety incidents, and this set of operations can be classified as safety critical. All other industrial control operations of the ICS can then be automatically classified as non-safety critical. The industrial control operations determined to be safety critical, and their associated safety limits, can be configured in the safety manager as a safety configuration.

Figure 3:
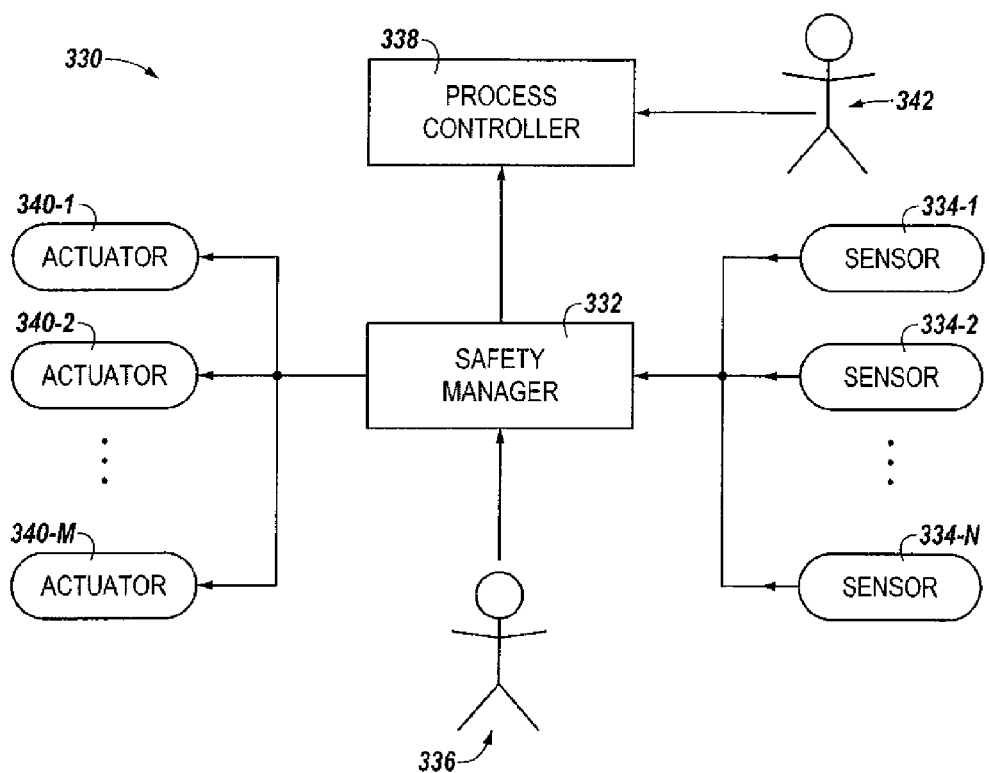
FIG. 3 illustrates a safety manager system of an industrial control system in accordance with one or more embodiments of the present disclosure.

FIG. 3 illustrates a safety manager system 330 of an ICS (e.g., ICS 100) in accordance with one or more embodiments of the present disclosure. As shown in FIG. 3, safety manager system 330 includes a safety manager 332 at the center of safety manager system 330. Safety manager 332 can enforce the safety limits of the ICS to contain the occurrence of safety incidents in the ICS.

As shown in FIG. 3, data can be input into safety manager 332 from sensors 334-1, 334-2, . . . , 334-N of safety manager system 330, the safety configuration for the ICS can be uploaded to safety manager 332 by an operator 336 (e.g., from a computing device of the operator) of safety manager system 330, and actions (e.g., physical processes) can be output from safety manager 332 to be controlled by process controller 338 and performed by actuators 340-1, 340-2, . . . 340-M. The actions output from safety manager 332 can be integrity protected and secure. Further, process controller 338 can control additional actions (e.g., additional physical processes) from other operators, such as operator 342 illustrated in FIG. 3.

Only industrial control operations that are associated (e.g., interact) with the data from sensors 334-1, 334-2, . . . 334-N, the safety configuration for the ICS, and/or the actions output from safety manager 332 may be classified as safety critical operations. Any other operation that is associated (e.g., interacts) with the actions controlled by process controller 338 may be intercepted by safety manager 332, which will enforce the safety limits of the ICS. Hence, these other operations can be classified as non-safety critical. For instance, in the example illustrated in FIG. 3, operations associated with actions from operator 342 can be classified as non-safety critical.

In some embodiments, operations that are related to safety manager 332 can be identified and used (e.g., by an automated algorithm) to build a set of safety critical operations. The set of safety critical operations can be presented to an administrator of the ICS for verification, approval, and/or modification.

In some embodiments, at least one of the number of controllers illustrated in FIG. 1 can permit the user of that controller to perform both safety critical and non-safety critical industrial control operations on a particular component or components of ICS 100. That is, in such embodiments, the controller can perform both safety critical and non-safety critical industrial control operations on the particular component(s). For instance, in the example illustrated in FIG. 1, controller 102-1 may perform both safety critical and non-safety critical operations on components 106-1 and 106-2, and/or controller 102-2 may perform both safety critical and non-safety critical operations on component 106-3.

In some embodiments, at least one of the number of controllers can permit the user of that controller to perform only safety critical industrial control operations on a particular component or components of ICS 100. That is, in such embodiments, the controller can perform only safety critical industrial control operations on the particular component(s) (e.g., the controller may not perform any non-safety critical operations on the particular component(s)). For instance, in the example illustrated in FIG. 1, controller 102-1 may perform only safety critical operations on components 106-1 and 106-2 (e.g., controller 102-1 may not perform any non-safety critical operations on components 106-1 and 106-2), and/or controller 102-2 may perform only safety critical operations on component 106-3 (e.g., controller 102-2 may not perform any non-safety critical operations on component 106-3).

In some embodiments, at least one of the number of controllers can permit the user of that controller to perform industrial control operations (e.g., both safety critical and non-safety critical operations, or only safety critical operations) on a single (e.g., only one) component of ICS 100. That is, in such embodiments, the controller can perform industrial control operations on only one component of ICS 100. For instance, in the example illustrated in FIG. 1, controller 102-2 may perform industrial control operations on only component 106-3.

In some embodiments, at least one of the number of controllers can permit the user of that controller to perform industrial control operations (e.g., both safety critical and non-safety critical operations, or only safety critical operations) on a plurality of (e.g., more than one) components of ICS 100. That is, in such embodiments, the controller can perform industrial control operations on more than one component of ICS 100. For instance, in the example illustrated in FIG. 1, controller 102-1 may perform industrial control operations on both components 106-1 and 106-2.

The industrial control operations that are to be performed only if the user is physically present at the location of the controller, and/or the industrial control operations that may be performed regardless of whether the user is physically present at the location of the controller, may be identified (e.g., determined) before the user of the controller attempts to perform industrial control operations using the controller. For instance, the determination of which industrial control operations are safety critical and which industrial control operations are non-safety critical can be made before they are attempted to be performed by the user.

Figure 2:
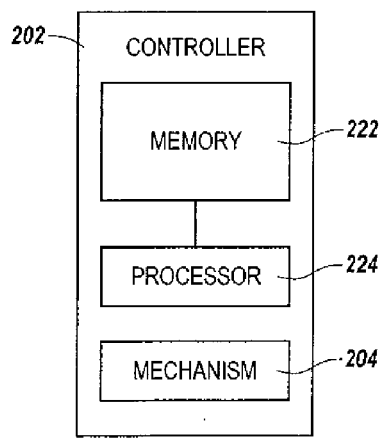
FIG. 2 illustrates an industrial control system controller in accordance with one or more embodiments of the present disclosure.

FIG. 2 illustrates an industrial control system (ICS) controller 202 in accordance with one or more embodiments of the present disclosure. ICS controller 202 can be, for example, controller 102-1 and/or controller 102-2 previously described in connection with FIG. 1.

As shown in FIG. 2, controller 202 includes a memory 222 and a processor 224 coupled to memory 222. Memory 222 can be any type of storage medium that can be accessed by processor 224 to perform various examples of the present disclosure. For example, memory 222 can be a non-transitory computer readable medium having computer readable instructions (e.g., computer program instructions) stored thereon that are executable by processor 224 to perform various examples of the present disclosure. That is, processor 224 can execute the executable instructions stored in memory 222 to perform various examples of the present disclosure.

Memory 222 can be volatile or nonvolatile memory. Memory 222 can also be removable (e.g., portable) memory, or non-removable (e.g., internal) memory. For example, memory 222 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 222 is illustrated as being located in controller 202, embodiments of the present disclosure are not so limited. For example, memory 222 can also be located internal to another computing resource (e.g., enabling computer readable instructions to be downloaded over the Internet or another wired or wireless connection).

As shown in FIG. 2, controller includes a mechanism 204. Mechanism 204 can verify (e.g., ensure) that a user (e.g., operator) of controller 202 is physically present at the location of controller 202, in a manner analogous to mechanisms 104-1 and 104-2 previously described in connection with FIG. 1. For example, mechanism 204 can be a button, switch, biometric scanner, fingerprint scanner, or interface that can verify that the user is physically present at the location of controller 202, in a manner analogous to that previously described in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:
1. An industrial control system controller, comprising:
 a mechanism configured to verify that a user of the industrial control system controller is physically present at a location of the controller;
 a memory; and
 a processor configured to execute executable instructions stored in the memory to:
  permit the user to perform safety critical industrial control operations on a plurality of physical components of an industrial control system that are to be performed using the controller only if the user is physically present at the location of the controller; and
  permit the user to perform additional non-safety critical industrial control operations on the plurality of physical components of the industrial control system that may be performed using the controller regardless of whether any user is physically present at the location of the controller at any time while the additional industrial control operations are being performed, wherein the determination of whether the industrial control operations are safety critical or non-safety critical is made by performing a fault tree analysis on the operations.

2. The controller of claim 1, wherein the fault tree analysis analyzes operations that can cause safety incidents.

3. The controller of claim 1, wherein fault tree is condensed to build the minimum set of non-repetitive industrial control operations that can result in safety incidents.

4. The controller of claim 1, wherein the mechanism is a button.

5. The controller of claim 1, wherein the mechanism is a switch.

6. The controller of claim 1, wherein the mechanism is a biometric scanner.

7. The controller of claim 1, wherein the mechanism is a fingerprint scanner.

8. The controller of claim 1, wherein the mechanism is an interface configured to receive a password from the user.

9. A method of operating an industrial control system controller, comprising:
  verifying, by the industrial control system controller, that a user of the controller is physically present at a location of the controller;
  preventing, by the controller, the user from performing safety critical industrial control operations on a plurality of physical components of an industrial control system that are to be performed only if the user is physically present at the location of the controller using the controller if the user is not physically present at the location of the controller; and
  permitting, by the controller, the user to perform additional non-safety critical industrial control operations on the plurality of physical components of the industrial control system that may be performed using the controller regardless of whether any user is physically present at the location of the controller at any time while the additional industrial control operations are being performed, wherein the determination of whether the industrial control operations are safety critical or non-safety critical is made by performing a fault tree analysis on the operations.

10. The method of claim 9, wherein the method includes permitting, by the controller, the user to perform the industrial control operations using the controller if the user is physically present at the location of the controller.

11. The method of claim 9, wherein the method includes identifying the industrial control operations before the user attempts to use the controller to perform the industrial control operations.

12. An industrial control system, comprising:
  a number of controllers, wherein:
    each of the number of controllers includes a mechanism configured to verify that a user of that respective controller is physically present at a location of that respective controller;
    one of the number of controllers is configured to permit the user to perform safety critical industrial control operations on a plurality of physical components of the industrial control system that are to be performed only if the user is physically present at the location of the controller using that one controller only if the user is physically present at the location of that one controller; and
    one of the number of controllers is configured to permit the user to perform non-safety critical industrial control operations on a plurality of physical components of the industrial control system that may be performed using that one controller regardless of whether any user is physically present at the location of that one controller at any time while the non-safety critical industrial control operations are being performed, wherein the determination of whether the industrial control operations are safety critical or non-safety critical is made by performing a fault tree analysis on the operations.

13. The industrial control system of claim 12, wherein:
  the safety critical industrial control operations include operations that could result in loss of life, injury, property damage, or environmental damage; and
  the non-safety critical industrial control operations include operations that would not result in loss of life, injury, property damage, or environmental damage.

14. The industrial control system of claim 12, wherein one of the number of controllers is configured to permit the user to perform both safety critical and non-safety critical industrial control operations on a particular physical component of the industrial control system.

15. The industrial control system of claim 12, wherein one of the number of controllers is configured to permit the user to perform only safety critical industrial control operations on a particular physical component of the industrial control system.

16. The industrial control system of claim 12, wherein one of the number of controllers is configured to permit the user to perform industrial control operations on a single physical component of the industrial control system.

17. The industrial control system of claim 12, wherein at least two of the number of controllers are at a same location.

18. The industrial control system of claim 12, wherein at least two of the number of controllers are at different locations.

* * * * *